: US006443436B1

United States Patent
Schel

(10) Patent No.: US 6,443,436 B1
(45) Date of Patent: Sep. 3, 2002

(54) AIR SPRING ASSEMBLY ON SHOCK ABSORBER WITH COMBINED SEAL

(75) Inventor: Jacobus Schel, Overasselt (NL)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/867,297

(22) Filed: May 29, 2001

(51) Int. Cl.[7] .................................................. F16F 9/04
(52) U.S. Cl. ..................................... 267/64.21; 267/220
(58) Field of Search ......................... 267/64.21–64.24, 267/220; 188/322.16–322.19

(56) References Cited

U.S. PATENT DOCUMENTS

| | | |
|---|---|---|
| 2,122,406 A | 7/1938 | Casper |
| 2,973,953 A | 3/1961 | Fikse |
| 3,000,624 A | 9/1961 | Cislo |
| 3,042,392 A | 7/1962 | Schmitz et al. |
| 3,046,000 A | 7/1962 | Polhemus et al. |
| 3,046,001 A | 7/1962 | Schultze |
| 3,063,701 A | 11/1962 | Long, Jr. |
| 3,063,702 A | 11/1962 | Long, Jr. |
| 3,074,709 A | 1/1963 | Ballard et al. |
| 3,078,965 A | 2/1963 | Bourcier de Carbon et al. |
| 3,088,556 A | 5/1963 | Bourcier de Carbon |
| 3,104,119 A | 9/1963 | Long, Jr. et al. |
| 3,149,829 A | 9/1964 | Baum |
| 3,149,830 A | 9/1964 | Broadwell |
| 3,178,167 A | 4/1965 | Loewis of Menar |
| 3,199,636 A | 8/1965 | Bourcier de Carbon |
| 3,235,221 A | 2/1966 | Conner |
| 3,385,590 A | 5/1968 | Avner |
| 3,527,451 A | 9/1970 | Long, Jr. |
| 3,588,064 A | 6/1971 | Montanari |
| 3,700,225 A | 10/1972 | Fader et al. |
| RE27,883 E | 1/1974 | Vogel et al. |
| 3,954,255 A | 5/1976 | Keijzer et al. |
| 3,954,256 A | 5/1976 | Keijzer et al. |
| 3,954,257 A | 5/1976 | Keijzer et al. |
| 4,088,207 A | 5/1978 | Kato |
| 4,113,072 A | 9/1978 | Palmer |
| 4,114,866 A | 9/1978 | Kato |
| 4,325,541 A | 4/1982 | Korosladanyi et al. |
| 4,392,638 A | 7/1983 | Kato et al. |
| 4,482,036 A * | 11/1984 | Wossner et al. ....... 188/322.13 |
| 4,491,160 A | 1/1985 | Axthammer et al. |
| 4,502,672 A | 3/1985 | Meller et al. |
| 4,534,545 A | 8/1985 | Fannin et al. |
| 4,555,096 A * | 11/1985 | Pryor .................... 188/321.11 |
| 4,574,450 A | 3/1986 | Fannin et al. |
| 4,629,170 A | 12/1986 | Warmuth, II |
| 4,643,407 A | 2/1987 | Zirk |
| 4,712,776 A | 12/1987 | Geno et al. |
| 4,802,657 A | 2/1989 | Wijnhoven et al. |
| 4,826,204 A | 5/1989 | Cameron |
| 5,009,401 A | 4/1991 | Weitzenhof |
| 5,518,225 A | 5/1996 | Gubitz |
| 5,529,155 A | 6/1996 | Jones et al. |
| 5,620,172 A * | 4/1997 | Fulks et al. ................. 267/221 |
| 5,649,691 A | 7/1997 | Handke et al. |
| 5,669,597 A | 9/1997 | Rittstieg et al. |

* cited by examiner

Primary Examiner—Christopher P. Schwartz
(74) Attorney, Agent, or Firm—Harness, Dickey & Pierce, PLC

(57) ABSTRACT

A strut includes a shock absorber and an air spring. The air spring is positioned around and concentric with the shock absorber. A sealing system is employed which seals the pressurized air chamber of the air spring. The sealing system utilizes an elastomeric seal located between the air spring and the shock absorber. The elastomeric seal can be a rectangular annular seal, an O-ring seal or an elastomeric seal bonded to a metal plate.

15 Claims, 4 Drawing Sheets

AIR SPRING ASSEMBLY ON SHOCK ABSORBER WITH COMBINED SEAL

FIELD OF THE INVENTION

The present invention relates to suspension struts for motor vehicles. More particularly, the present invention relates to a separate air seal which seals the compressed air located within an air spring which is associated with the suspension strut.

BACKGROUND OF THE INVENTION

MacPherson struts are being employed in many present day vehicles and are being designed into many future vehicles. These struts comprise a combination wheel suspension strut and shock absorber which eliminates the requirement of an upper control arm in the suspension system. The elimination of the upper control arm provides an increase in space for the engine and transmission or transaxle within the engine compartment of the vehicle. This additional space is especially advantageous for front wheel drive vehicles which include an "east-west" engine rather than the traditional "north-south" orientation for rear wheel drive vehicles.

A typical strut includes the suspension spring positioned coaxially around the shock absorber. The spring extends from a bracket mounted on the outer tube of the shock absorber to a bracket that is integrated into the top mounting system for the strut. The suspension spring can be a steel coil spring or the suspension spring can be an air spring assembly.

When an air spring assembly is used with the strut, the air spring assembly is positioned co-axially over the shock absorber assembly and it is typically fixed to the vehicle body (sprung mass) through the top mounting system for the shock absorber.

Regardless of which type of mounting system is utilized to attach the air spring assembly to the vehicle body (sprung mass), it is absolutely necessary to maintain a sealed pressure chamber within the air spring assembly itself. The pressurized air within the air spring assembly supports the sprung mass of the vehicle. Thus, there is a need to adequately seal the air spring assembly both at the interface with the upper mounting system as well as the interface with the shock absorber in the strut suspension system.

The continued development of the strut suspension systems incorporating air spring assemblies concentric with the shock absorber includes the development of sealing systems which seal the pressurized chamber for the air spring assembly.

SUMMARY OF THE INVENTION

The present invention provides the art with a sealing system which provides a seal at the interface between the air spring assembly and the shock absorber. This system provides the necessary sealing to prevent air leakage from the air spring assembly to the outside environment around the strut.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
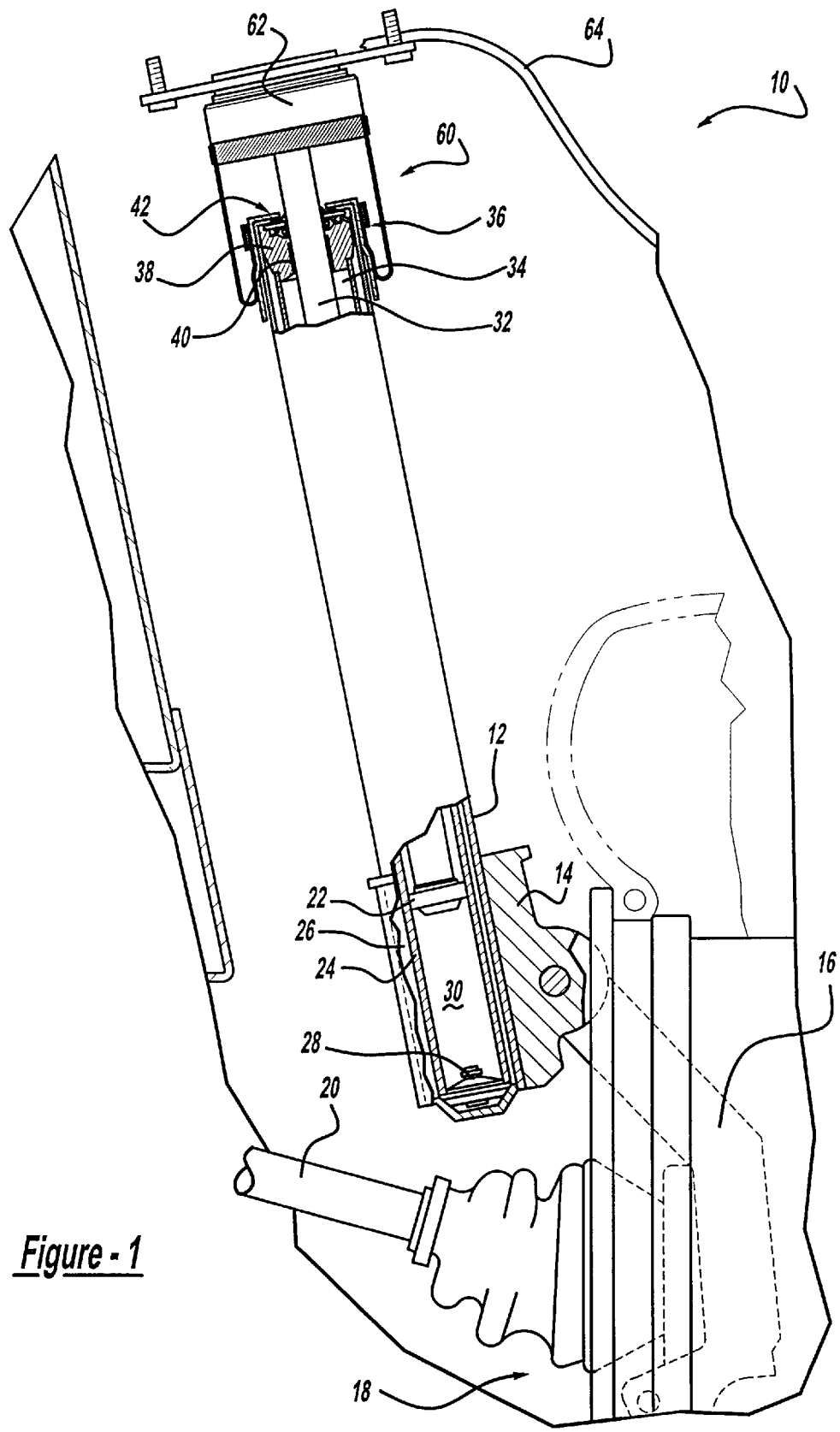
FIG. 1 is a side view, partially in cross section, of a front suspension system which incorporates the unique sealing system in accordance with the present invention.
Figure 2:
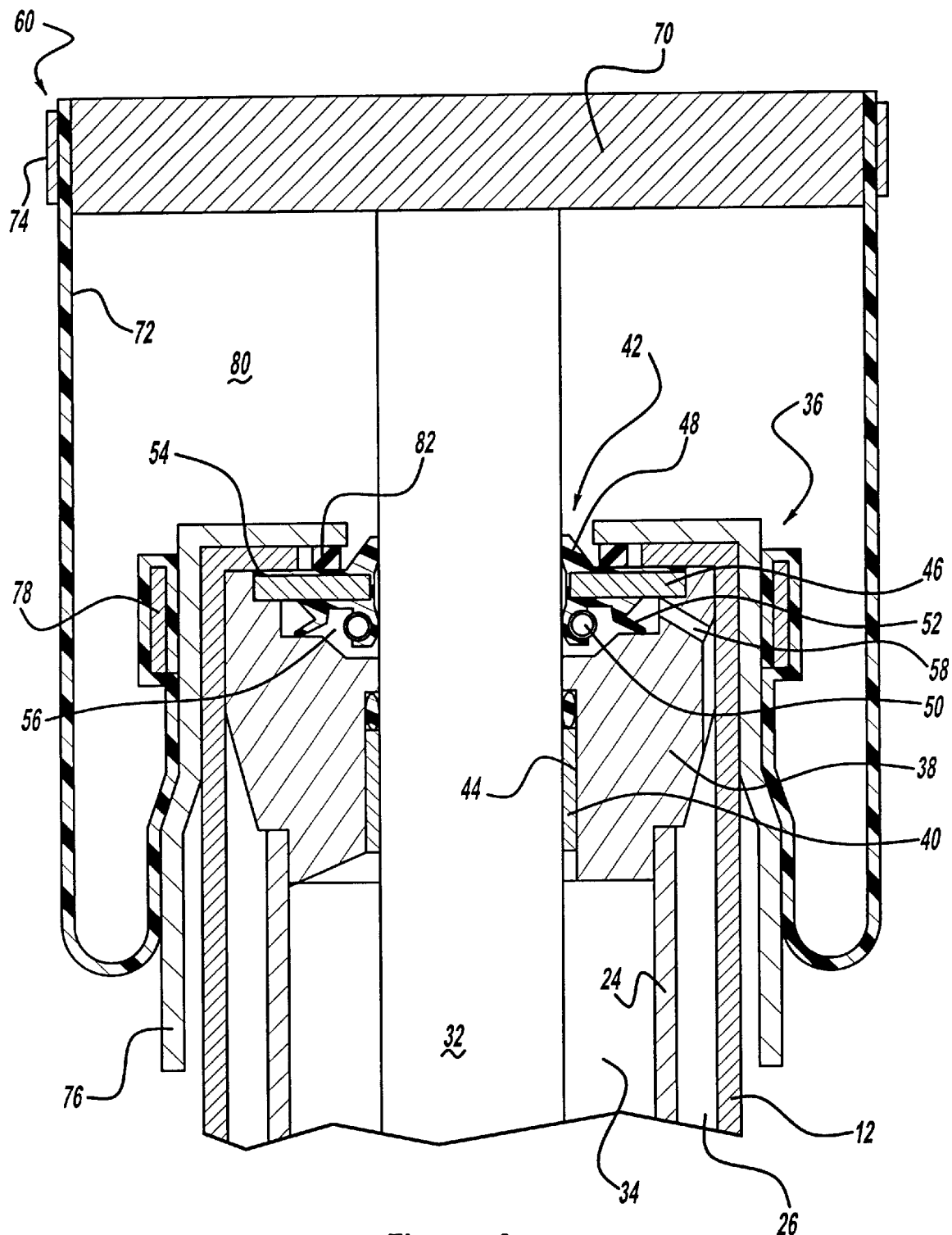
FIG. 2 is an enlarged view of the air spring/shock absorber interface shown in FIG. 1.

Referring now to the drawings in which like reference numerals designate like or corresponding parts throughout the several views, there is shown in FIG. 1 a MacPherson type suspension strut which incorporates the unique air spring/shock absorber interface in accordance with the present invention and which is designated generally by the reference numeral 10. Strut 10 comprises an outer reservoir tube 12 supported at its lower end in a cup-like mounting bracket 14. Mounting bracket 14 is attached to a steering knuckle 16 of a steerable front road wheel assembly 18 driven by a rotatable shaft 20. Secured with reservoir tube 12 is a hydraulic shock absorber having a valved piston 22 mounted for reciprocating sliding movement in a pressure tube 24 radially spaced inwardly from reservoir tube 12 to provide a reservoir 26 for hydraulic damping fluid of strut 10. A base valve 28 provides for the controlled hydraulic communication between reservoir 26 and a lower working chamber 30 formed by piston 22 and pressure tube 24. Piston 22 is connected to the lower end of a cylindrical piston rod 32 which extends axially and upwardly through an upper working chamber 34 and a rod guide assembly 36.

Rod guide assembly 36 comprises a rod guide 38, a bushing 40 and a rod seal assembly 42. Rod guide 38 is secured to both reservoir tube 12 and pressure tube 24. Bushing 40 is disposed within a central bore 44 in rod guide 38 through which piston rod 32 extends. Seal assembly 42 comprises an annular disc 46, a wiper seal 48, piston rod seal 50, a one-way seal 52 and a static seal 54. Wiper seal 48 is positioned towards the upper end of piston rod 32 and it operates to wipe dirt and residue from rod 32 as it moves in and out of rod guide assembly 36. Piston rod seal 50 rides against piston rod 32 and it serves to seal the oil and pressurized gas within reservoir 26 and upper working chamber 34. Seal 52 is positioned between rod guide 38 and annular disc 46. Seal 52 allows oil and gas which has migrated to a chamber 56 between seal assembly 42 and rod guide 38 to return to reservoir 26 through a passage 58 extending through rod guide 38. While seal 52 allows movement of gas from chamber 56 to reservoir 26, flow of gas in the opposite direction is prohibited by the design of seal 52. Seal 54 provides an oil seal and a gas seal between chamber 26 and the outside environment. Annular disc 46 is received within a pocket machined into rod guide 38. Preferably, seals 48, 50, 52 and 54 are all bonded to annular disc 46. Annular disc 46 can be manufactured from metal or plastic.

An air spring assembly 60 is located between reservoir tube 12 and an upper mounting system 62. Upper mounting system 62 is secured to a sheet metal tower 64 formed in the wheel well of the vehicle body.

Air spring assembly 60 includes a top cover 70 which is secured to or is a part of upper mounting system 62. An air sleeve 72 is sealingly attached at one end to top cover 70 by a clamping ring 74. The opposite end of air sleeve 72 is secured to an air spring piston 76 by a clamping ring 78. Air spring piston 76 is secured to reservoir tube 12 by the use of a press fit relationship between the outside diameter of reservoir tube 12 and the inside diameter of piston 76. Air spring assembly 60 defines a sealed chamber 80 which receives pressurized air in order to support the weight of the sprung mass of the vehicle.

The proper operating of air spring assembly 60 and thus the proper support for the sprung mass of the vehicle requires the sealing of chamber 80. The present invention provides an elastomeric seal 82 which is disposed between air spring piston 76 and annular disc 46 of seal assembly 42. Elastomeric seal 82 can be a loose component, it can be bonded to air spring piston 76 or preferably it can be bonded to annular disc 46. Seal 82 is designed such that during the assembly of piston 76 to reservoir tube 12, seal 82 is compressed or preloaded. Seal 82 provides a gas seal between chamber 80 and the outside environment.

Figure 3:
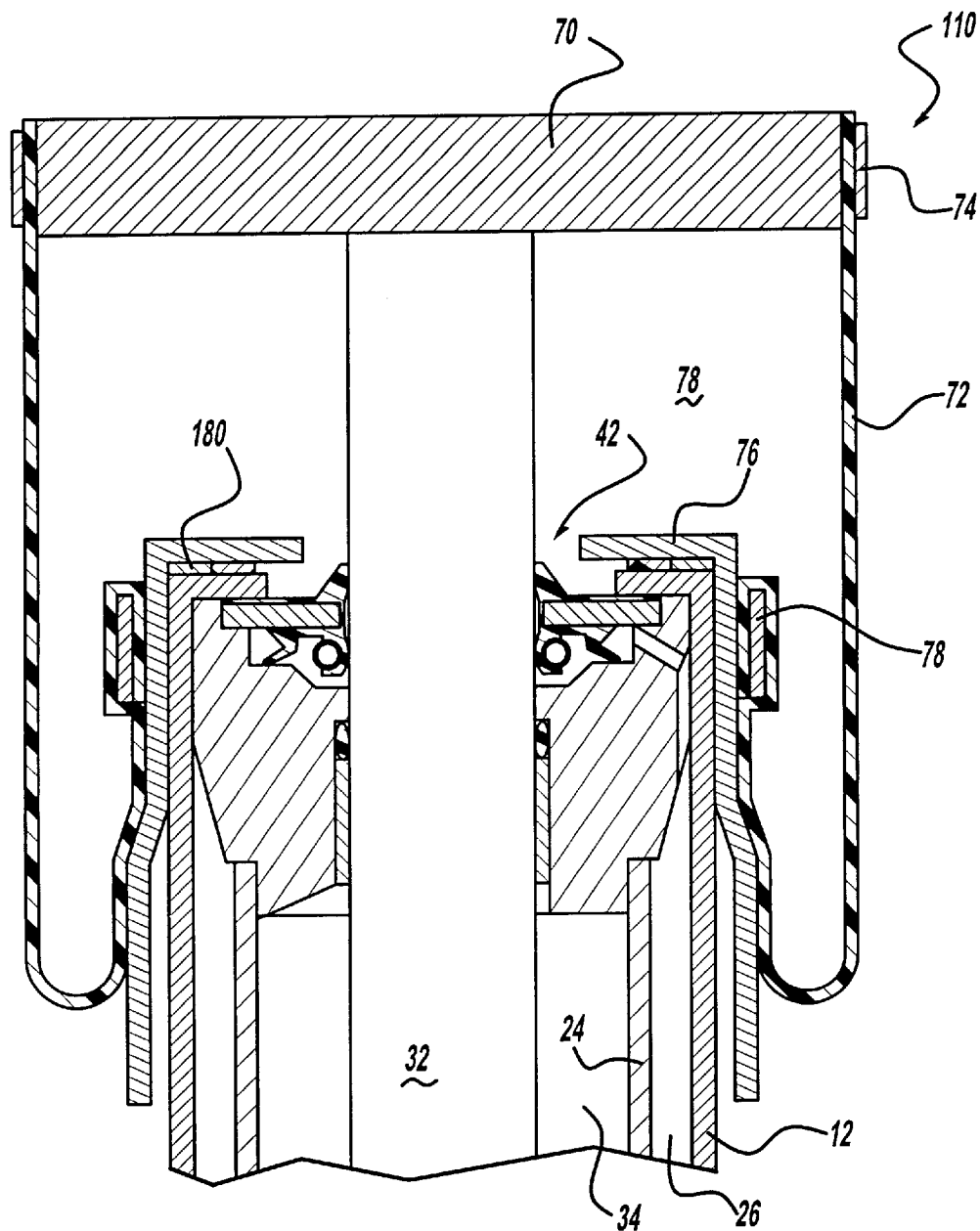
FIG. 3 is an enlarged view of an air spring/shock absorber interface in accordance with another embodiment of the present invention.
Figure 4:
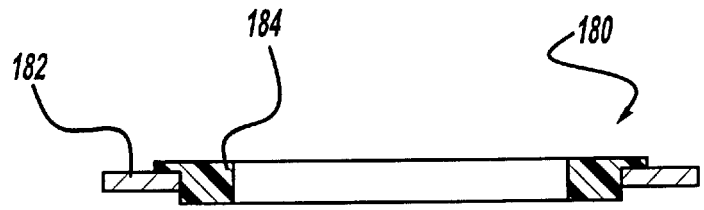
FIG. 4 is a cross sectional view of the seal assembly shown in FIG. 3.

Referring now to FIGS. 3 and 4, a MacPherson strut assembly 110 is illustrated. Strut 110 is the same as strut 10 except that elastomeric seal 82 has been replaced with seal assembly 180. Seal assembly 180 comprises an annular metal plate 182 and an elastomeric seal 184 preferably manufactured from volcanized rubber which is bonded to plate 182. Plate 182 is designed to mate with piston 76 to position seal 184 between air spring piston 76 and reservoir tube 12 as shown in FIG. 3. Seal 184 is compressed and preloaded in the same manner as described above for seal 82 and seal 184 provides the same sealing as described above from seal 82.

Figure 5:
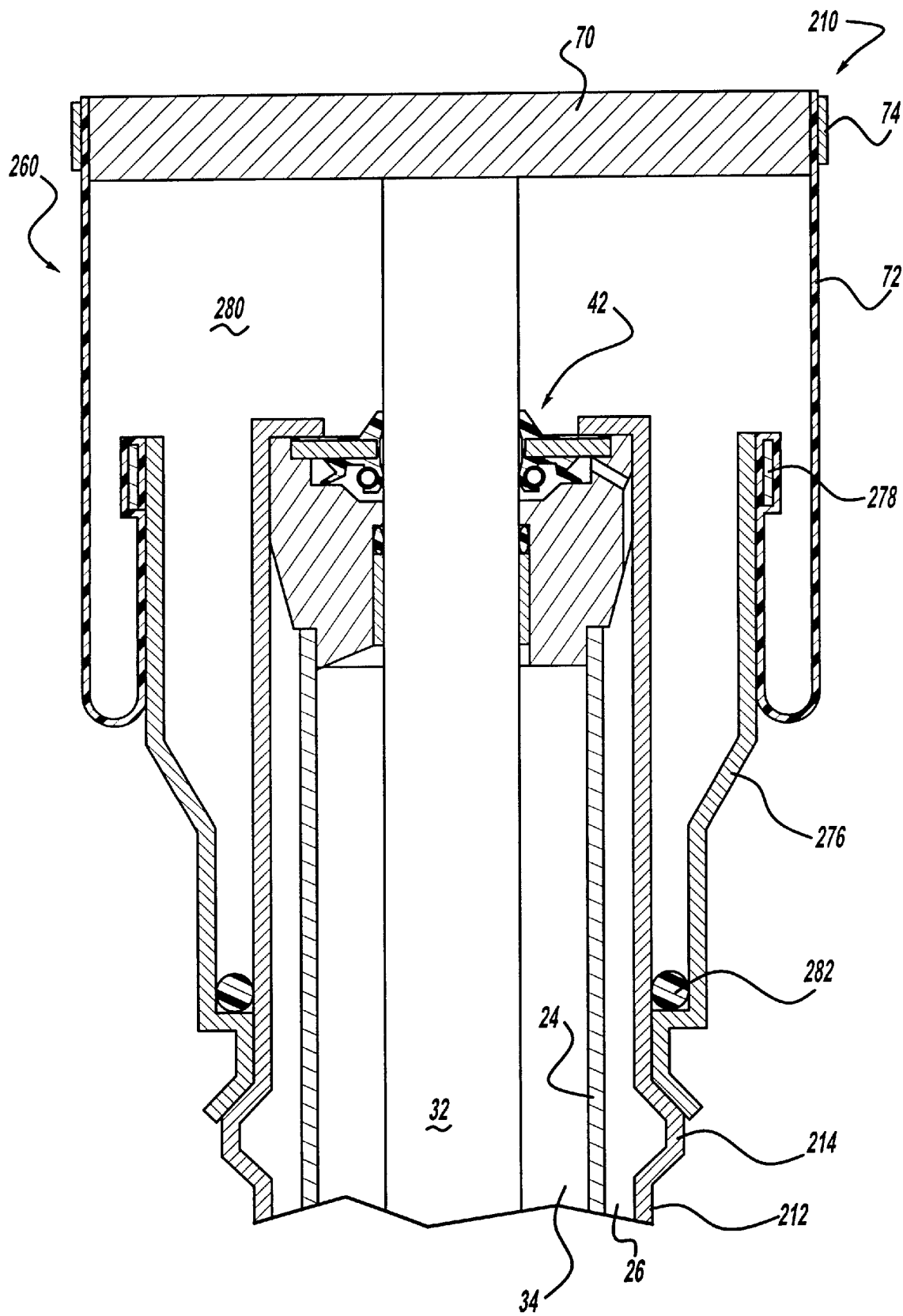
FIG. 5 is an enlarged view of an air spring/shock absorber interface in accordance with another embodiment of the present invention.

Referring now to FIG. 5, a MacPherson strut assembly 210 is illustrated. Strut 210 is the same as strut 10 except that reservoir tube 12 has been replaced with reservoir tube 212 and air spring assembly 60 has been replaced with air spring assembly 260. Reservoir tube 212 is the same as reservoir tube 12 with the exception that reservoir tube 212 defines and outwardly extending deformation 214 which supports air spring assembly 260.

Air spring assembly 260 includes top cover 70 which is secured to or a part of upper mounting system 62. Air sleeve 72 is sealingly attached at one end to top cover 70 by clamping ring 74. The opposite end of air sleeve 72 is secured to an air spring piston 276 by a clamping ring 278. Air spring piston 276 is secured to reservoir tube 212 by the use of a press fit relationship between the outside diameter of reservoir tube 212 and the inside diameter of piston 276. Outwardly extending deformation 214 forms a seat for piston 276 prohibiting further displacement of piston 276 along tube 212. Air spring assembly 260 defines a sealed chamber 280 which receives pressurized air in order to support the weight of the sprung mass of the vehicle.

Similar to air spring assembly 60, the proper operation and thus the proper support for the sprung mass of the vehicle requires the sealing of chamber 280. The present invention provides an elastomeric O-ring or seal 282 which is disposed between air spring piston 276 and reservoir tube 212. O-ring or seal 282 provides a gas seal between chamber 280 and the outside environment.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A suspension strut comprising:
    a shock absorber;
    an air spring assembly surrounding said shock absorber, said air spring piston including a generally cylindrical body and a radially inwardly extending flange, said air spring assembly including:
        a top cover;
        an air spring piston attached to said shock absorber, said air spring piston being in a press fit relation with said shock absorber;
        an air sleeve extending between said top cover and said air spring piston to define a sealed chamber; and
        an elastomeric seal disposed between said shock absorber and said radially inwardly extending flange of air spring piston for sealing said sealed chamber.

2. The suspension strut according to claim 1, wherein said elastomeric seal is bonded to said air spring piston.

3. The suspension strut according to claim 2, wherein said shock absorber includes a rod guide assembly, said elastomeric seal being disposed between said air spring piston and said rod guide assembly.

4. The suspension strut according to claim 3, wherein said rod guide assembly includes a rod seal assembly, said elastomeric seal being disposed between said air spring piston and said rod seal assembly.

5. The suspension strut according to claim 1, wherein said shock absorber includes a rod guide assembly, said elastomeric seal being disposed between said air spring piston and said rod guide assembly.

6. The suspension strut according to claim 5, further comprising a metal plate secured to said elastomeric seal, said metal plate engaging said air spring piston to position said elastomeric seal.

7. The suspension strut according to claim 5, wherein said rod guide assembly includes a rod seal assembly, said elastomeric seal being disposed between said air spring piston and said rod seal assembly.

8. The suspension strut according to claim 7, wherein said elastomeric seal is bonded to said rod seal assembly.

9. The suspension strut according to claim 1, wherein said shock absorber includes a rod seal assembly, said elastomeric seal being disposed between said air spring piston and said rod seal assembly.

10. The suspension strut according to claim 9, wherein said elastomeric seal is bonded to said rod seal assembly.

11. The suspension strut according to claim 9, wherein said elastomeric seal is bonded to said air spring piston.

12. The suspension strut according to claim 1, wherein said elastomeric seal is an O-ring.

13. The suspension strut according to claim 12, wherein said shock absorber includes a tube having an outer surface and said air spring piston defines an inner surface, said O-ring being disposed between said inner and said outer surface.

14. The suspension strut according to claim 1, wherein said shock absorber includes a tube having an outer surface and said air spring piston defines an inner surface, said elastomeric seal being disposed between said inner and said outer surface.

15. The suspension strut according to claim 1, further comprising a metal plate secured to said elastomeric seal, said metal plate engaging said air spring piston to position said elastomeric seal.

\* \* \* \* \*